United States Patent
Ishaq (10) Patent No.: US 10,515,354 B1
(45) Date of Patent: Dec. 24, 2019

(54) DISCOUNTED CARD NOT PRESENT RATES FOLLOWING FAILED CARD PRESENT ATTEMPTS

(71) Applicant: Square, Inc., San Francisco, CA (US)

(72) Inventor: Naeem Ishaq, San Francisco, CA (US)

(73) Assignee: Square, Inc., San Francisco, CA (US)

(*) Notice: Subject to any disclaimer, the term of this patent is extended or adjusted under 35 U.S.C. 154(b) by 665 days.

(21) Appl. No.: 14/562,285

(22) Filed: Dec. 5, 2014

(51) Int. Cl.
*G06Q 20/34* (2012.01)
*G06Q 20/18* (2012.01)
*G06Q 20/32* (2012.01)

(52) U.S. Cl.
CPC ............. *G06Q 20/34* (2013.01); *G06Q 20/18* (2013.01); *G06Q 20/322* (2013.01)

(58) Field of Classification Search
CPC ..................................................... G06Q 20/34
USPC .......................................................... 705/35
See application file for complete search history.

(56) References Cited

U.S. PATENT DOCUMENTS

| 3,863,050 | A | * | 1/1975 | Brugger | G06K 5/00 |
| | | | | | 235/380 |
| 4,048,476 | A | * | 9/1977 | Lawter | G06K 13/08 |
| | | | | | 235/479 |
| 5,859,414 | A | | 1/1999 | Grimes et al. | |
| 5,861,614 | A | | 1/1999 | Gardner | |
| 6,311,165 | B1 | * | 10/2001 | Coutts | G06Q 20/1085 |
| | | | | | 235/379 |
| 7,702,553 | B1 | * | 4/2010 | Dickelman | G06Q 20/10 |
| | | | | | 705/35 |
| 8,745,698 | B1 | | 6/2014 | Ashfield et al. | |
| 8,777,104 | B1 | | 7/2014 | Brock et al. | |

(Continued)

FOREIGN PATENT DOCUMENTS

EP 2 579 194 A1 4/2013
WO 2013/147904 A1 10/2013

(Continued)

OTHER PUBLICATIONS

"Understanding Credit Card Frauds," by Tej Paul Bhatla; Vikram Prabhu and Amit Dua. Cards Business Review # 2003-01. Published: Jun. 2003 (Year: 2003).*

(Continued)

*Primary Examiner* — Sara C Hamilton
(74) *Attorney, Agent, or Firm* — Lee & Hayes, P.C.

(57) ABSTRACT

Merchants that have access to financial transaction card readers sometimes experience failed card reads when attempting a transaction. The merchant may then perform the transaction by manually entering account information from the financial transaction card, which can cause the merchant to be charged a higher fee than would have been charged if the transaction had been performed with the card reader. Technology is disclosed for providing discounted transaction rates for a card not present transaction following a failed card read. This is accomplished by detecting a failed card read of a financial transaction card through a card reader; detecting a card not present transaction including receiving user input of textual account access data; matching the failed card read with the card not present transaction; and crediting a difference between a fee charged for the card not present transaction and a fee which would have been charged for the attempted transaction.

28 Claims, 7 Drawing Sheets

(56) References Cited

U.S. PATENT DOCUMENTS

| | | | |
|---|---|---|---|
| 8,967,471 B1 | 3/2015 | Rosenthal et al. | |
| 8,990,121 B1* | 3/2015 | Guise | G06Q 20/3829 |
| | | | 705/71 |
| 9,165,296 B2 | 10/2015 | Gannon | |
| 9,286,500 B1* | 3/2016 | Post | G06K 7/14 |
| 9,396,730 B2 | 7/2016 | Karpey et al. | |
| 9,530,128 B1 | 12/2016 | Bekmann et al. | |
| 9,836,732 B1 | 12/2017 | Mocko et al. | |
| 9,852,410 B1 | 12/2017 | Chen et al. | |
| 9,996,829 B1 | 6/2018 | Baig et al. | |
| 2002/0099649 A1* | 7/2002 | Lee | G06Q 20/04 |
| | | | 705/38 |
| 2002/0123972 A1 | 9/2002 | Hodgson et al. | |
| 2005/0071232 A1 | 3/2005 | Frater | |
| 2006/0240890 A1 | 10/2006 | Walker et al. | |
| 2006/0249574 A1* | 11/2006 | Brown | G06K 19/06187 |
| | | | 235/380 |
| 2006/0255128 A1 | 11/2006 | Johnson et al. | |
| 2007/0108279 A1* | 5/2007 | Wang | G06K 7/0021 |
| | | | 235/441 |
| 2008/0005037 A1 | 1/2008 | Hammad et al. | |
| 2008/0208743 A1 | 8/2008 | Arthur et al. | |
| 2008/0319869 A1 | 12/2008 | Carlson et al. | |
| 2009/0055276 A1 | 2/2009 | Dunsmore et al. | |
| 2010/0005013 A1* | 1/2010 | Uriarte | G06Q 20/04 |
| | | | 705/30 |
| 2010/0057612 A1* | 3/2010 | Wagenhals | G06Q 20/102 |
| | | | 705/40 |
| 2010/0063945 A1* | 3/2010 | Cowan, Jr. | G06Q 20/20 |
| | | | 705/500 |
| 2010/0114776 A1 | 5/2010 | Weller et al. | |
| 2010/0299195 A1 | 11/2010 | Nix et al. | |
| 2011/0047075 A1 | 2/2011 | Fourez | |
| 2011/0254655 A1 | 10/2011 | Maalouf et al. | |
| 2011/0313871 A1 | 12/2011 | Greenwood | |
| 2012/0173410 A1 | 7/2012 | Gillin | |
| 2013/0073347 A1 | 3/2013 | Bogaard et al. | |
| 2013/0132854 A1 | 5/2013 | Raleigh et al. | |
| 2013/0226318 A1 | 8/2013 | Procyk et al. | |
| 2013/0297512 A1 | 11/2013 | Phillips et al. | |
| 2013/0304561 A1 | 11/2013 | Warner et al. | |
| 2013/0331675 A1 | 12/2013 | Batman et al. | |
| 2013/0346222 A1 | 12/2013 | Ran | |
| 2014/0195272 A1 | 7/2014 | Sadiq et al. | |
| 2014/0207683 A1 | 7/2014 | Bailey et al. | |
| 2014/0279113 A1 | 9/2014 | Balasubramanian | |
| 2014/0312118 A1 | 10/2014 | Marcus et al. | |
| 2015/0041534 A1 | 2/2015 | Rayner et al. | |
| 2015/0074366 A1 | 3/2015 | Calciu et al. | |
| 2015/0081557 A1 | 3/2015 | Kinfoil et al. | |
| 2015/0106216 A1 | 4/2015 | Kenderov | |
| 2015/0242662 A1* | 8/2015 | Claessen | G06K 7/10267 |
| | | | 340/658 |
| 2015/0277967 A1 | 10/2015 | Calciu et al. | |
| 2015/0379506 A1 | 12/2015 | Griffin | |
| 2016/0055538 A1 | 2/2016 | Todasco | |
| 2016/0063480 A1 | 3/2016 | Ballesteros et al. | |
| 2017/0262827 A1 | 9/2017 | Lee | |
| 2018/0315038 A1 | 1/2018 | Rezayee | |
| 2018/0268408 A1 | 9/2018 | Botros et al. | |

FOREIGN PATENT DOCUMENTS

| | | |
|---|---|---|
| WO | 2014/174261 A1 | 10/2014 |
| WO | 2018/125444 A1 | 7/2018 |

OTHER PUBLICATIONS

Ex Parte Quayle Office Action dated Jan. 31, 2014, for U.S. Appl. No. 14/091,019, of Brock, Z. et al., filed Nov. 26, 2013.
Notice of Allowance dated Mar. 20, 2014, for U.S. Appl. No. 14/091,019, of Brock, Z. et al., filed Nov. 26, 2013.
Notice of Allowance dated Apr. 7, 2014, for U.S. Appl. No. 14/091,019, of Brock, Z. et al., filed Nov. 26, 2013.
Ex Parte Quayle Office Action dated Sep. 17, 2014, for U.S. Appl. No. 14/331,090, of Rosenthal, N. et al., filed Jul. 14, 2014.
Notice of Allowance dated Oct. 27, 2014, U.S. Appl. No. 14/331,090, of Rosenthal, N. et al., filed Jul. 14, 2014.
U.S. Appl. No. 14/300,060, of Brock, Z. et al., filed Jun. 9, 2014.
"Clemson University Parking Services Parking Citations," Clemson University, dated Dec. 5, 2010, pp. 1-2.
"EMV Integrated Circuit Card Specifications for Payment Systems; Book 3: Application Specification," dated Jun. 2008, Version 4.2, Section-10.5, pp. 1-238.
"PIN Bypass in the U.S. Market," EMV Migration Forum White Paper, dated Feb. 2016, Version 1.1, retrieved from Internet URL: https://web.archive.org/web/20161020113903/http://www.emv-connection.com:80/downloads/2016/02/PIN-Bypass-WP-V1.1-Public-Release-FINAL-February-2016.pdf, on May 28, 2018, pp. 1-12.
Novak, E.J., "Security and Privacy for Ubiquitous Mobile Devices," The College of William and Mary, dated 2016, Retrieved from the Internet URL: https://search.proquest.com/docview/183158787 5/ED0257082428464BPQ/8?accountid=14753, on Jan. 17, 2018, pp. 1-2.
Non-Final Office Action dated Dec. 11, 2014, for U.S. Appl. No. 14/323,747, of Wagner, D.R., filed Jul. 3, 2014.
Non-Final Office Action dated Mar. 12, 2015, for U.S. Appl. No. 14/455,577, of Bekmann, J., et al., filed Aug. 8, 2014.
Final Office Action dated Apr. 23, 2015, for U.S. Appl. No. 14/323,747, of Wagner, D.R., filed Jul. 3, 2014.
Final Office Action dated Sep. 24, 2015, for U.S. Appl. No. 14/455,577, of Bekmann, J., et al., filed Aug. 8, 2014.
Non-Final Office Action dated Oct. 21, 2015, for U.S. Appl. No. 14/323,747, of Wagner, D.R., filed Jul. 3, 2014.
Non-Final Office Action dated Oct. 23, 2015, for U.S. Appl. No. 14/307,334, of Chen, G.H., et al., filed Jun. 17, 2014.
Advisory Action dated Jan. 5, 2016, for U.S. Appl. No. 14/455,577, of Bekmann, J., et al., filed Aug. 8, 2014.
Final Office Action dated Mar. 23, 2016, for U.S. Appl. No. 14/323,747, of Wagner, D.R., filed Jul. 3, 2014.
Non-Final Office Action dated Apr. 22, 2016, for U.S. Appl. No. 14/455,577, of Bekmann, J., et al., filed Aug. 8, 2014.
Final Office Action dated May 20, 2016, for U.S. Appl. No. 14/307,334, of Chen, G.H., et al., filed Jun. 17, 2014.
Notice of Allowance dated Aug. 18, 2016, for U.S. Appl. No. 14/455,577, of Bekmann, J., et al., filed Aug. 8, 2014.
Advisory Action dated Aug. 25, 2016, for U.S. Appl. No. 14/307,334, of Chen, G.H., et al., filed Jun. 17, 2014.
Non-Final Office Action dated Feb. 27, 2017, for U.S. Appl. No. 14/307,334, of Chen, G.H., et al., filed Jun. 17, 2014.
Non-Final Office Action dated Mar. 2, 2017, for U.S. Appl. No. 15/390,918, of Baig, R., et al., filed Dec. 27, 2016.
Non-Final Office Action dated Mar. 17, 2017, for U.S. Appl. No. 14/553,704, of Mocko, C.L., et al., filed Nov. 25, 2014.
Notice of Allowance dated Aug. 3, 2017, for U.S. Appl. No. 14/553,704, of Mocko, C.L., et al., filed Nov. 25, 2014.
Notice of Allowance dated Aug. 30, 2017, for U.S. Appl. No. 14/307,334, of Chen, G.H., et al., filed Jun. 17, 2014.
Final Office Action dated Sep. 11, 2017, for U.S. Appl. No. 15/390,918, of Baig, R., et al., filed Dec. 27, 2016.
Non-Final Office Action dated Oct. 6, 2017, for U.S. Appl. No. 15/476,657, of Yip, T., et al., filed Mar. 31, 2017.
Advisory Action dated Dec. 27, 2017, for U.S. Appl. No. 15/390,918, of Baig, R., et al., filed Dec. 27, 2016.
Notice of Allowance dated Jan. 26, 2018, for U.S. Appl. No. 15/390,918, of Baig, R., et al., filed Dec. 27, 2016.
Final Office Action dated Mar. 28, 2018, for U.S. Appl. No. 15/476,657, of Yip, T., et al., filed Mar. 31, 2017.
International Search Report and Written Opinion for International Application No. PCT/US2017/063054, dated Feb. 13, 2018.
International Search Report and Written Opinion for International Application No. PCT/US2018/023392, dated Jun. 11, 2018.
Advisory Action dated Jun. 25, 2018, for U.S. Appl. No. 15/476,657, of Yip, T., et al., filed Mar. 31, 2017.
Notice of Allowance dated Aug. 15, 2018, for U.S. Appl. No. 15/087,698, of White, M.W., et al., filed Mar. 31, 2016.

(56) References Cited

OTHER PUBLICATIONS

International Search Report and Written Opinion for International Application No. PCT/US2018/029807, dated Jul. 26, 2018.

* cited by examiner

DISCOUNTED CARD NOT PRESENT RATES FOLLOWING FAILED CARD PRESENT ATTEMPTS

BACKGROUND

People use a multitude of electronic devices. Some of these electronic devices can be attached to mobile devices such as smart phones, for example an iPhone or Galaxy, or tablets, for example an iPad or Surface. One example of such an electronic device is a card reader. A card reader can read account data from a financial transaction card such as a credit card or ATM card. Account data may be encoded on the financial transaction card, such as in a magnetic strip or integrated circuit. The card reader may pass account data read from the financial transaction card to the attached mobile device in order to process a transaction.

These electronic devices are occasionally defective or fail over time, causing failed card reads. Furthermore, even with a well-functioning card reader, failed card reads may occur due to human error, such as swipe speed or angle. When a card reader is not available or a failed card read occurs, a user may enter account data from the financial transaction card, such as from account data imprinted or written on the financial transaction card.

BRIEF DESCRIPTION OF THE DRAWINGS

Embodiments of the present invention will be described and explained through the use of the accompanying drawings in which.

DETAILED DESCRIPTION

Technology is disclosed herein for providing discounted transaction rates or transaction fee rebates for a card not present transaction following a failed card read. Using cash to conduct transactions is becoming continually less common. Instead, people are using alternate forms of payment such as financial transaction cards linked to payment accounts. As used herein, "financial transaction cards" comprise any of credit cards, debit cards, pre-paid cards, charge cards, RFID or other near field transmitters, or any other payment device encoded with information configured to allow access to one or more payment accounts, including virtual credit cards such as transmitters within a mobile device. As used herein, this encoded information configured to allow access to one or more payment accounts is referred to as "account data" or "account access data." As used herein, a "card storage medium" is a memory, as defined below, included with a financial transaction card that stores account data.

Over 26 billion credit card transactions occur each year in the United States alone. However, many transactions still cannot be performed using a credit card because the merchant involved does not accept them. This can be due to the impression that accepting credit cards requires expensive scanning equipment and network technologies. New types of card readers exist that allow much broader use of credit cards. In some implementations, these card readers are attached to mobile devices such as smart phones, tablets, or other computing devices to read a magnetic strip, integrated circuit, or other data medium storing account access data. In exchange for a transaction fee such as a percentage of the transaction amount, these card readers make credit card transactions possible anywhere without significant investment. These types of transactions where account access data is read directly from a card storage medium of a financial transaction card are referred to herein as "card present transactions."

In some instances, such as where a user improperly utilizes a card reader or where a card reader has become at least partially inoperative, one or more failed card reads can occur. A "failed card read," as used herein, refers to an attempt to utilize a card reader to read account data directly from a card storage medium where the attempt does not result in data sufficient to complete a transaction associated with the card reader utilization. When a failed card read occurs, alternative methods of entering account access data without employing a card reader device can be utilized. As used herein, these alternative methods are referred to as "card not present transactions," and include any method of receiving account access data where the account access data is received using a method other than reading the account access data from a card storage medium. Examples of card not present transactions include manual entry of account access data with a keyboard or receiving an image of data imprinted or printed onto the surface of a financial transaction card.

Creditors who operate credit card payment networks typically charge a higher fee rate for card present transactions than for card not present transactions due to the perception that fraud is more likely to occur in card not present transactions than in card present transactions. This perception is due to it being less difficult to just intercept and use account access information in a card not present transaction than to intercept and this information in a magnetic strip or other card mechanisms of a fake card, before using the that fake card with a card reader in a card present transaction. Additionally, in some cases it is easier for someone interested in improperly obtaining another's account access data to intercept it during a card not present transaction than to obtain the data used in a card present transaction. For example, the data used in a card present transaction can be encoded or may bypass malice software and hardware such as a keystroke logger or web form filed reader. However, when a card present transaction is attempted but fails, merchants may become frustrated with paying the higher fee rate, which may lead to merchants switching to a different payment system. Thus, it can be beneficial to correlate instances in which a card present transaction was attempted but resulted in a failed card read and a subsequent card not present transaction was performed to complete the transaction intended by the card present transaction, and where this correlation is found, perform the transaction at a lower rate or rebate a portion of the fee amount, thereby avoiding a negative user experience.

For example, a merchant may attempt a transaction for $100 by repeatedly swiping a credit card through a card reader, attempting to perform a card present transaction. However, due to the merchant performing each swipe too slowly, the swipes can result in a failed card read. The merchant, not wanting to forgo the transaction, may then manually enter the numbers imprinted on the credit card to complete the transaction as a card not present transaction. The merchant may be charged for the card not present transaction, such as at 3.5% ($3.50 for this transaction). However, if the transaction had been successful as a card present transaction, the merchant may have been charged at a lower rate, such as 2.75% ($2.75 for this transaction). Upon determining that an attempt to complete this transaction was first made as a card present transaction, the difference between the amount charged and the amount that would have been charged for a card present transaction ($3.50−$2.75=$0.75) can be refunded to the merchant. The merchant can also be notified, such as through email or a notification in the card not present payment system, of this refund, thereby alleviating the negative user experience.

Several embodiments of the described technology are discussed below in more detail in reference to the figures. Those skilled in the art will appreciate that the blocks illustrated in each of the diagrams discussed below may be altered in a variety of ways. For example, the order of the logic may be rearranged, sub steps may be performed in parallel, illustrated logic may be omitted, other logic may be included, etc.

Figure 1:
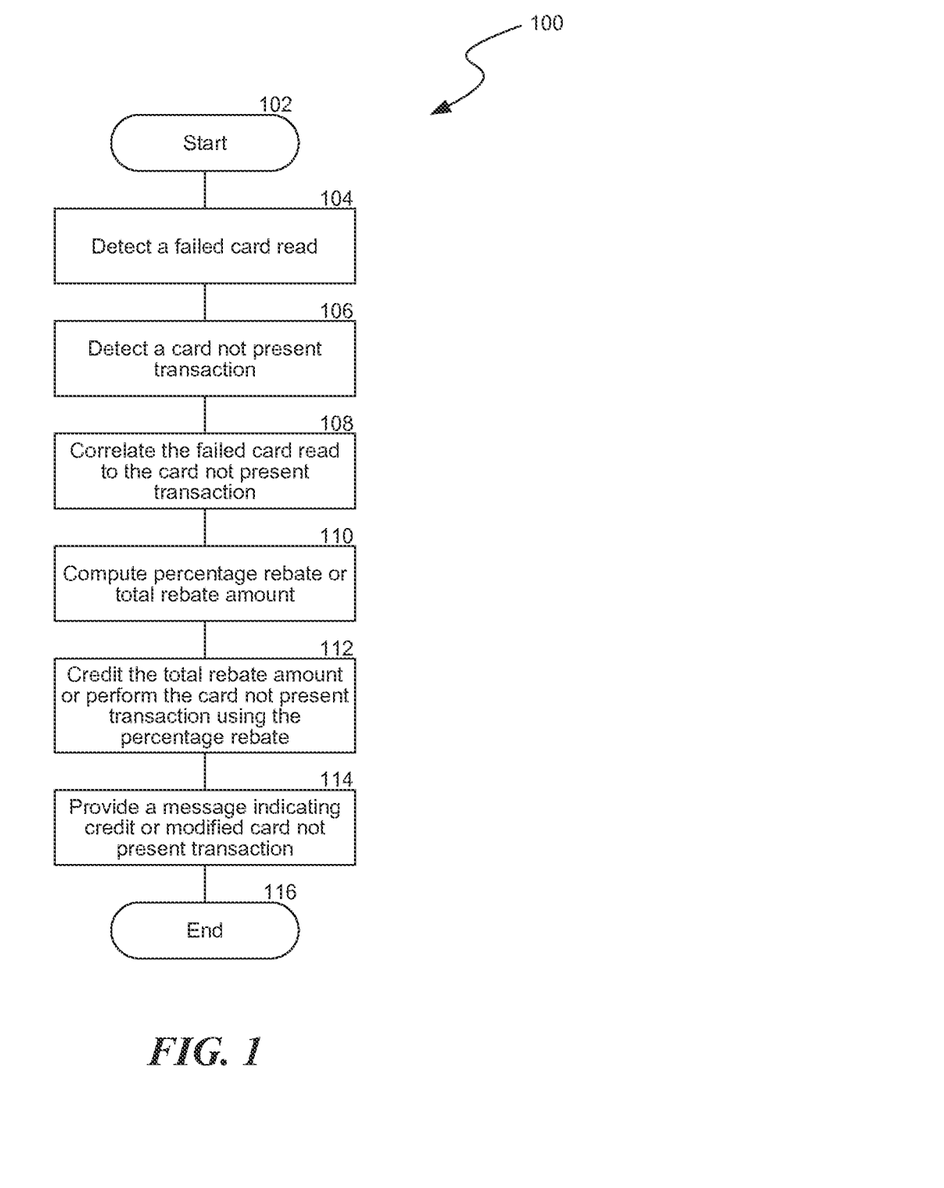
FIG. 1 is a flow diagram illustrating a process used in some embodiments for providing discounted transaction rates for a card not present transaction following a failed card read.

FIG. 1 is a flow diagram illustrating a process 100 used in some embodiments for providing discounted transaction rates for a card not present transaction following a failed card read. The process begins at block 102 and continues to block 104. At block 104, a failed card read is detected. Detecting a failed card read can include receiving partial or un-verifiable data through a card reader or triggering a device configured to monitor the card reader, such as a motion sensor. A detected failed card read can be associated with data such as the time the failed card read occurred, an identification of the merchant, card reader, what computing system performing the attempted transaction, or data about the attempted transaction such as the amount, an identification of a purchase item, an identification of the purchaser, the partial or un-verifiable account data, etc. The attempted transaction can also be associated with a fee rate which would have been charged if the attempted transaction had been successful. For example, a fee rate for a card present transaction can be 2.75%. In some implementations, detecting a failed card read can comprise receiving identifications and associated data of one or more failed card reads.

At block 106, a card not present transaction is detected. As discussed above, a card not present transaction is a transaction where the account access data can be entered without requiring the presence of a financial transaction card, such as user typing in account data to a keyboard or submitting a picture of data printed on a financial transaction card. The detected card not present transaction can include data similar to the data associated with the failed card read such as the time the card not present transaction occurred, an identification of the merchant or computing system performing the card not present transaction, or data about the card not present transaction such as a transaction amount, an identification of a purchase item, an identification of the purchaser, account data, etc. The card not present transaction can also be associated with a fee rate which was or will be charged for the card not present transaction. For example, a fee rate for a card not present transaction can be 3.5%.

At block 108, the detected failed card read from block 104 is correlated with the detected card not present transaction from block 106. In some implementations, this correlation comprises matching data associated with the detected failed card read with data associated with a detected card not present transaction. For example, a failed card read for a transaction of a particular amount at a particular time can be correlated to a card not present transaction where the card not present transaction is within a particular time window after the time of the failed card read and is for the same amount. Correlating failed card reads with card not present transactions is discussed in more detail below in relation to FIG. 2. A correlated pair of a failed card read and a card not present transaction is referred to herein as a "transaction pair."

At block 110, process 100 computes a percentage rebate and/or total rebate amount for the transaction pair. A percentage rebate can be computed as a difference between A) a percentage fee rate which was or will be charged for the card not present transaction and B) a percentage fee which would have been charged for the attempted transaction associated with the detected failed card read. For example, the card not present transaction can have been charged a percentage fee of 3.5% and the attempted transaction can be associated with a percentage fee of 2.75% which would have been charged had the attempted transaction been successful. The percentage rebate amount can then be computed as the difference between 3.5% and −2.75%, or 0.75%.

A total rebate amount for the transaction pair can be computed as a difference between A) a total fee which was or will be charged for the card not present transaction and B) a total fee which would have been charged for the attempted transaction associated with the detected failed card read. For example, the card not present transaction for $500 can have been charged a percentage fee of 3.5%, for a total fee of $17.50, and the attempted transaction, also for $500, can be associated with a percentage fee of 2.75%, for a total fee of $13.75, which would have been charged had the attempted transaction been successful. The total rebate amount can then be computed as the difference between $17.50 and $13.75, or $3.75.

In some implementations where the card not present transaction has occurred, at block 112, a credit for the total rebate amount is provided to an entity that paid, or is responsible for paying, a fee for the card not present transaction. Crediting the total rebate amount can comprise immediately transferring funds to an account of the entity that paid the total fee for the card not present transaction, aggregating a number of rebate amounts for later crediting to an account of the entity that paid the total fee for the card not present transaction, providing discounts on future services such as reduced transaction fees, or some other transfer of value to the entity that paid the total fee for the card not present transaction. In some implementations where the card not present transaction has not yet been completed, at block 112, the card not present transaction can be performed using the percentage fee associated with the attempted card present transaction or using percentage rebate amount such as by using it to discount the card not present transaction fee. For example, this can be accomplished by modifying an amount charged by an intermediary such as a provider that was involved with the card read failure or that provided software that received the information for the card not present transaction.

At block 114 a message can be provided indicating the credit or modification to the card not present transaction performed at block 112. Providing a message can comprise a notification that a rebate will occur or a notification that the card not present transaction will occur for a lower total fee amount or at a lower percentage fee. The message can be provided as part of a display in a flow of a card not present transaction, as a separate notification on a mobile device, through an alternate communication transmission such as a text message or email, or as part of a transaction log for one or more completed transactions. Generating this message is discussed in more detail below in relation to FIG. 3. Process 100 continues to block 116, where it ends.

Figure 2:
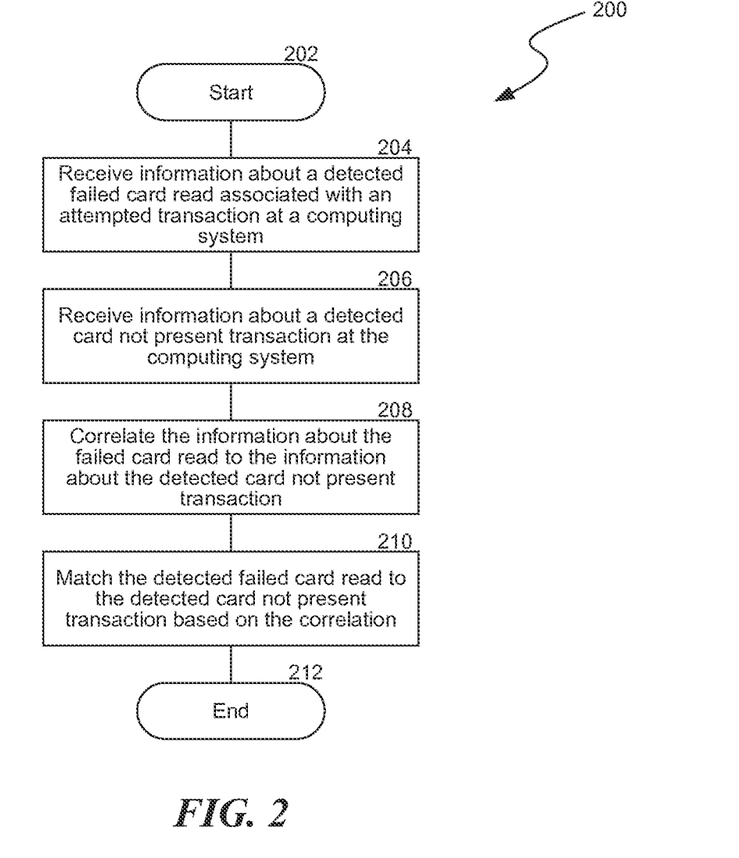
FIG. 2 is a flow diagram illustrating a process used in some embodiments for matching a failed card read to a card not present transaction.

FIG. 2 is a flow diagram illustrating a process 200 used in some embodiments for matching a failed card read to a card not present transaction. Process 200 begins at block 202. At block 204, information about a transaction associated with a detected failed card read is received for later comparison. In some implementations, information about multiple card reader actuations can be received at block 204. As discussed below, based on this received information, a subset of these failed card reads can be matched as a failed card read to one or more card not present transactions.

The received information about a detected failed card read can comprise any of: the transaction time, location, amount, purchaser identification, items or services involved in the transaction, transaction identification number, or a transaction type or card read type. Alternatively or in addition, the detected card read may have produced partial or un-verifiable account data which can be received at block 204. For example, part or all of an account number, an issuing credit agency, financial transaction card expiration date, cvv, owner information such as address, phone number, email, or zip code, card reader identification, such as association of a card reader as a member of a set of card readers for a particular merchant, identification of a device to which the card reader is attached, or other data read from the card storage medium of the financial transaction card during the failed card read, or hardware involved in the failed card read, or entered as part of the attempted transaction can be received at block 204. In some instances, a detected failed card read can be associated with multiple card reader actuations, such as multiple swipes of a credit card through a magnetic strip card reader. In these instances, the presence of the multiple actuations can be an indication of the failed card read. In addition, the data received at block 204 can be from a single card reader actuation or can be a composite of multiple of the card read actuations.

For example, a merchant may have multiple card readers attached to multiple mobile devices. The merchant may attempt a transaction for $23, using a VISA credit card, at 12:00, with a first card read at a first card reader. If this transaction fails the merchant may attempt the same transaction at 12:01 with a second card read at a second card reader attached to another mobile device owned by the merchant. This card read can also fail. The first card read and the second card read can be determined to be part of the same card read failure. A partial account number and the 12:00 time, obtained from the first card read, the 12:01 time and that the card is a VISA card, obtained from the second card read, and the same transaction amount and merchant IO for both card readers can be associated with the card read failure and received at block 204.

At block 206, information about a card not present transaction is received. This information can be received after the card not present transaction has been completed or prior to the completion of the card not present transaction. This information about the card not present transaction can comprise information useful for matching, using information received in block 204, the card not present transaction to one or more failed card reads. For example, the information about the card not present transaction can comprise the transaction time, location, amount, purchaser identification, items or services involved in the transaction, transaction identifier, a transaction type, an account number, an issuing credit agency, card expiration date, cvv, owner information such as address, phone number, email, or zip code, identification of a merchant, identification of a device that performed the card not present transaction, or other data entered for the card not present transaction.

At block 208, the information received at block 204 about one or more failed card reads is correlated to the information received at block 206 about one or more card not present transactions. In various implementations, making correlations comprises: matching known values associated with a failed card read with the value for the same data type from a card not present transaction; matching, for a data type, known values associated with a failed card read to within a threshold difference of a value from a card not present transaction; or determining that, for a selected failed card read, a data value for a data type of that card failure does not have a corresponding data value for that data type for a selected card not present transaction. For example, a correlation can be made for the data types of: transaction amount, purchaser identification, items or services involved in the transaction, a transaction type, an account number, an issuing credit agency, card expiration date, cvv, owner information such as address, phone number, email, or zip code, identification of a merchant, or identification of a device that performed the card not present transaction. In some implementations when an associated data value for both a failed card read and a card not present transaction is known for any of these data types, a correlation between the failed card read and the card not present transaction can exist where there is an exact match between the values for a selected data type.

As a further example, a correlation between the data types of: the transaction time or location, when an associated data value for both a failed card read and a card not present transaction is known for either of these data types, a correlation between the failed card read and the card not present transaction can exist where there is a threshold level of closeness between the values for a selected data type, such as one or five minutes for the time data type and 10, 50, or 100 feet for the location data type. In some implementations, a particular time window (also referred to herein as a time interval) can be specified with a fixed amount of time. In some implementations, the particular time window can have a variable length. The time window can depend on other activity such as an intervening successful transaction. For example, a period of time (T) can have a first value in a circumstance where a failed swipe (X) is followed by a card not present transaction (A) of the card within time T, which can result in a correlation of X an A. However, time T can have a different second value when a failed swipe (Y) of a first card followed by a successful swipe (B) of another card and then a card not present entry (C) of the first card would not correlate Y to C, because intervening transaction B makes the correlation less likely. In the second instance, time T can be cut short at the occurrence of B.

In addition, for data types where an exact match is required for a correlation, if only a portion of the associated value is known for a failed card read, such as where a portion of an account number was received, there can be a required amount of matching data between the portion of the value for that data type for the failed card read and the value of that data type for a card not present transaction, such as a 25%, 50%, 75%, or 90% match.

At block 210 one or more matches between failed card reads and card not present transactions are made based on the data correlations found in block 208. In some implementations, determining a match can require a correlation between one or more particular values such as time, transaction amount, or the device that performed the failed card read and the card not present transaction. In some implementations, determining a match can require all the data types in any selected one of multiple sets of data types to have a correlation. For example, the sets could be: time and a 50% account number correlation; time and an item or service identification correlation; or amount, purchaser identification, and merchant identification correlations. In some implementations, a value can be assigned to each correlation and a match occurs when a total correlation value between a failed card read and a card not present transaction exceeds a minimum. In some implementations, matches can be limited to only successive transactions. For example, where there is a first card present transaction for a first card, followed by any second transaction using a different card, followed by a third card not present transaction, the first and third transaction can be prevented from being a match despite a high data correlation due to the intervening second transaction. In some implementations, this intervening transaction can only prevent matches where the card used in the intervening transaction is owned by a different entity. This is because an intervening failed transaction using a different card owned by the same entity is more likely to occur when a first card present transaction failure occurs. Once any available matches are made, process 200 continues to block 212, where it ends.

Figure 3:
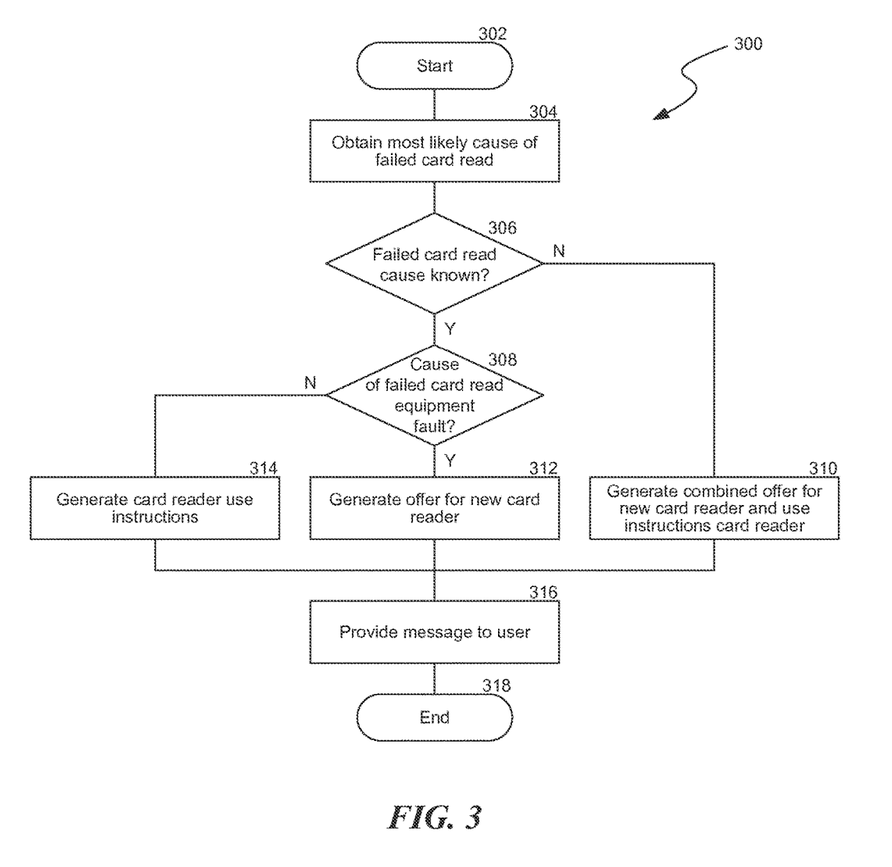
FIG. 3 is a flow diagram illustrating a process used in some embodiments for providing a rebate message appropriate for a type of failed card read.

FIG. 3 is a flow diagram illustrating a process 300 used in some embodiments for providing a rebate message appropriate for a type of failed card read. Process 300 begins at block 302 and continues to block 304. At block 304, a most likely cause of a detected failed card read is determined. A failed card read can be caused by a problem with a card reader or an improper use of a card reader. A failed card read and its type can be detected by receiving data from a card reader that a card read was attempted but insufficient account data was retrieved from a card storage medium, by retrieving account data from a card reader that cannot be used to perform an attempted transaction (i.e. cannot be verified), or by receiving data from instrumentation monitoring a card reader. In some cases, at block 304, a most likely cause of a detected failed card read can be indeterminate.

At block 306, if a cause of the failed card read was determined at block 304, process 300 continues to block 308. Otherwise process 300 continues to block 310. At block 310, a message is generated with both an offer to replace a card reader which may have caused a failed card read and instructions on how to avoid failed card reads due to improper card reader use, such as a proper speed and angle to perform a card swipe.

At block 308, if the cause of the failed card read was a problem with a card reader, such as a defect in a card reader or a worn out card reader, process 300 continues to block 312. If the cause of the failed card read was an incorrect use of a card reader, process 300 continues to block 314. At block 312, a message is generated with an offer to replace a card reader which may have caused a failed card read. At block 314, a message is generated with instructions on how to avoid failed card reads due to improper card reader use.

At block 316, the message generated at block 310, 312, or 314 is provided to a user. As discussed below in relation to FIGS. 4A and 4B, the message can also identify that a rebate will occur for a completed card not present transaction or that a card not present transaction that is about to occur will be at a reduced rate commensurate with a card present transaction. The message can also include additional information such as condolences for the trouble the user is having, additional help, advertising, or corporate information. Process 300 continues to block 318, where it ends.

Figure 4A:
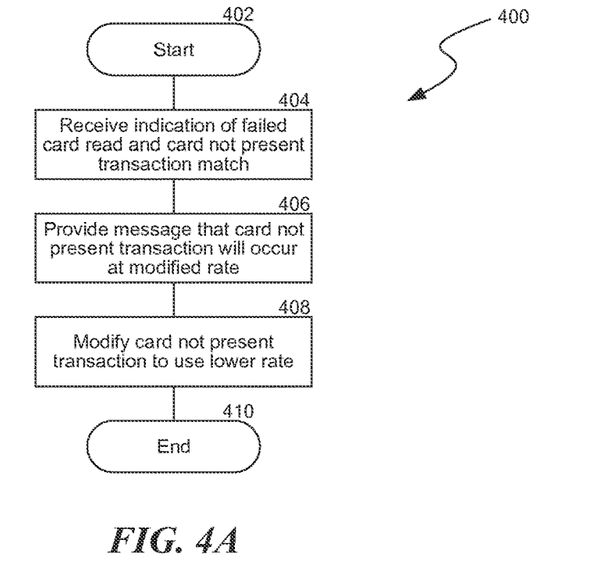
FIG. 4A is a flow diagram illustrating a process used in some embodiments for discounting a card not present transaction.

FIG. 4A is a flow diagram illustrating a process 400 used in some embodiments for providing a discount message and modifying a card not present transaction. Process 400 relates to some implementations where a match between a failed card read and a card not present transaction is found prior to the completion of the card not present transaction. Process 400 begins at block 402 and continues to block 404, where an indication of a match between a failed card read and a card not present transaction is received. This match can be based on correlations between A) data received about the failed card read and an attempted transaction associated with the failed card read, as discussed above, and B) data received for a card not present transaction. The card not present transaction can be initiated explicitly as a result of a detected failed card read. For example, after detecting a failed card read, a system can initiate a process to perform a card not present transaction and provide a message to the user such as "We are sorry you were unable to perform a card swipe. Would you like to manually enter the card information instead?" Alternatively, a failed card read and card not present transaction that has not yet been completed can be matched by comparing data for one or more failed card reads to data entered into an interface for a card not present transaction. For example, a system can monitor inputs to a form used for card not present transactions to find a match between previously detected failed card reads and the data that is being entered into the card not present transaction form.

At block 406 a message can be provided indicating that, due to a failed attempt to perform this transaction as a card present transaction, the card not present transaction that the user is about to perform will be completed at a rate lower than the standard card not present transaction rate. Calculating the lower rate is discussed above in relation to FIG. 1. This message can be provided as an integrated part of the display used for the card not present transaction; as a "pop-up" type message over the display used for the card not present transaction; in a separate notification, such as in a designated notification area of a mobile device which will facilitate the card not present transaction; by SMS or email; or by some other communication method. Determining the content of the message is discussed above in more detail in relation to FIG. 3.

At block 408, the card not present transaction is modified to use the lower rate identified in the message of block 406. In some implementations, modifying the card not present transaction comprises performing the card not present transaction at a card not present rate required by a creditor and adjusting down a fee amount received by an intermediary, such as a provider of the card reader that was used for the failed card read or the provider of the card not present transaction software, such that it appears to a merchant that the card not present transaction was performed at the lower rate. Process 400 continues to block 410, where it ends.

Figure 4B:
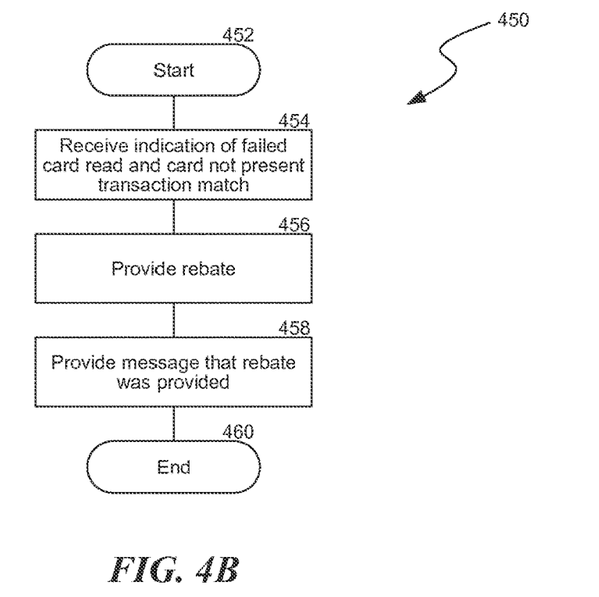
FIG. 4B is a flow diagram illustrating a process used in some embodiments for providing a rebate for a performed card not present transaction.

FIG. 4B is a flow diagram illustrating a process 450 used in some embodiments for providing a rebate for a performed card not present transaction and corresponding message. Process 450 relates to some implementations where a rebate is provided instead of modifying the card not present transaction such as where a match between a failed card read and a card not present transaction is found after completion of the card not present transaction. Process 450 begins at block 452 and continues to block 454, where an indication of a match between a failed card read and a card not present transaction is received. This match can be found as discussed above in relation to block 404. In addition, this match can be found by comparing A) data received about the failed card read and an attempted transaction associated with the failed card read and B) data used to complete one or more card not present transactions. For example, a system can receive a set of failed card reads and a set of card not present transactions and find matches based on data correlations as discussed above in relation to FIG. 2.

At block 456, a rebate is provided to an entity that paid a fee for the completed card not present transaction. The rebate amount can be for the difference between the fee that was paid for the card not present transaction and the amount that would have been paid if that transaction had been completed as a card present transaction. This rebate can be provided immediately to an account of the entity that paid the fee, can be aggregated with other rebates or credits for later dispersal, can be issued as a credit against future card transaction fees, or can use alternative payment methods such as credit toward a merchandise upgrade or toward other services. In some implementations, only a percentage, such as 25%, 50%, or 75%, of this difference is rebated.

At block 458 a message can be provided that, due to a failed attempt to perform a transaction as a card present transaction, the user will be provided with a rebate to compensate them for the increased rate they paid for the card not present transaction. This message can be provided as an integrated part of the display used for the card not present transaction; as a "pop-up" type message over the display used for the card not present transaction; in a separate notification, such as in a designated notification area of a mobile device which will facilitate the card not present transaction; by SMS or email; or by some other communication method. Determining the content of the message is discussed above in more detail in relation to FIG. 3. Process 450 continues to block 460, where it ends.

Figure 5:
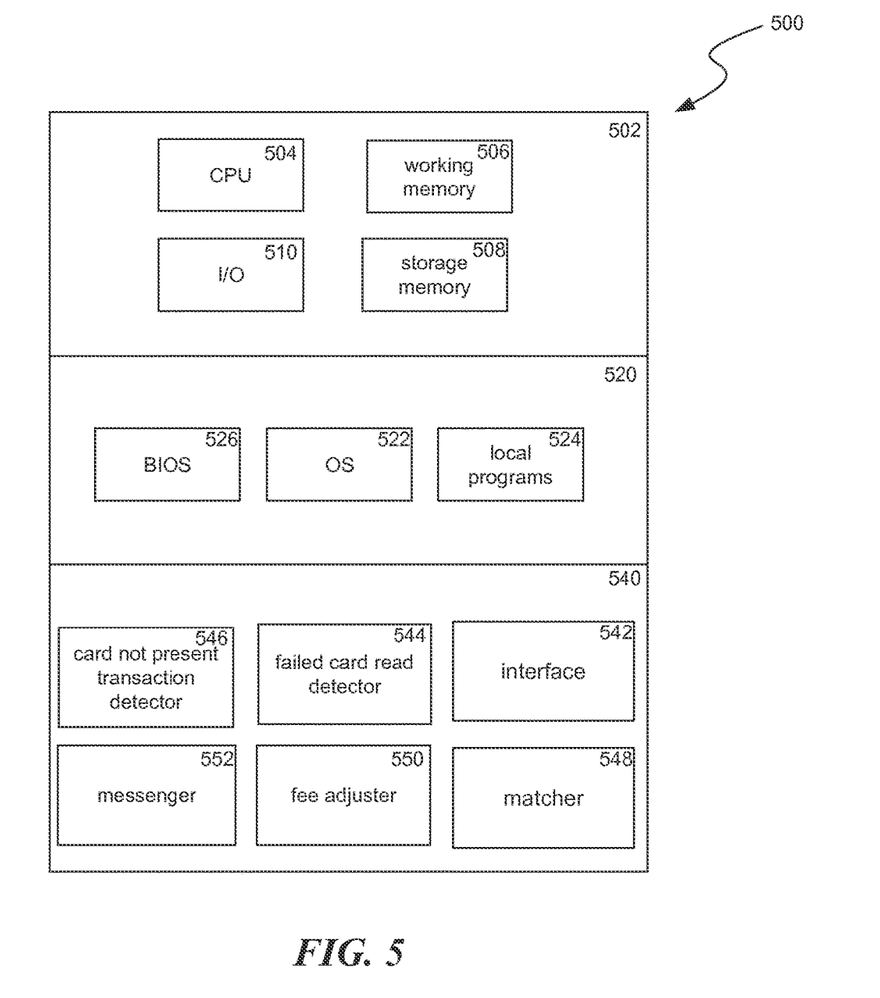
FIG. 5 is a block diagram illustrating components which, in some embodiments, can be used in a system implementing the disclosed technology.
Figure 7:
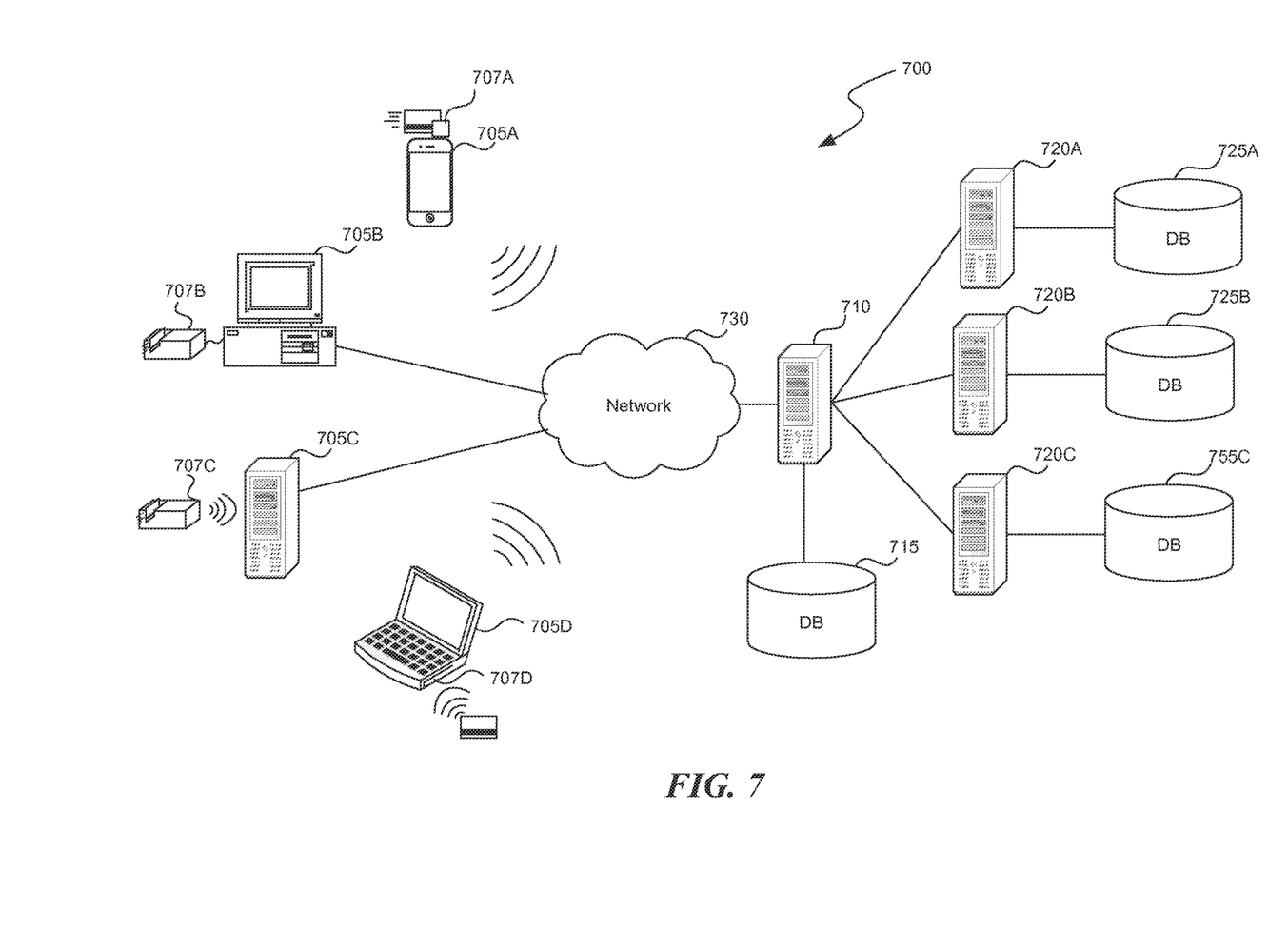
FIG. 7 is a block diagram illustrating an overview of an environment in which some embodiments of the disclosed technology can operate.

FIG. 5 is a block diagram illustrating components 500 which, in some embodiments, can be used in a system implementing the disclosed technology. The components 500 include hardware 502, general software 520, and specialized components 540. As discussed in more detail below, a system implementing the disclosed technology can use various hardware including a central processing unit 504, working memory 506, storage memory 508, and input and output devices 510. Components 500 can be implemented in a client computing device such as client computing devices 705 or on a server computing device, such as server computing devices 710 or 720 discussed below.

General software 520 can include various applications including an operating system 522, local programs 524, and a BIOS 526. Specialized components 540 can be subcomponents of a general software application 520, such as a local program 524. Specialized components 540 can include failed card read detector 544, card not present transaction detector 546, matcher 548, fee adjuster 550, messenger 552, and components which can be used for controlling and receiving data from the specialized components, such as interface 542, which can be implemented as a transceiver.

Failed card read detector 544 can be configured to receive data from a card reader or instrumentation monitoring a card reader and determine when a failed card read has occurred. Failed card read detector 544 can evaluate received account data to determine that it is associated with a failed card read because it is incomplete. Failed card read detector 544 can receive monitoring data, such as from a motion sensor, to determine that a card read was attempted. Failed card read detector 544 can associate, with a detected failed card read, data about the failed card read and a corresponding attempted transaction, such as transaction amounts, purchaser identifications, items or services involved in transactions, transaction types, account numbers, issuing credit agencies, card expiration dates, cvvs, merchant identifications, identifications of devices that were involved with a failed card read, or card or account owner information, such as addresses, phone numbers, emails, or zip codes.

Card not present transaction detector 546 can be configured to receive data from a computing device to detect card not present transactions or to detect that some data for a card not present transaction has been entered. Card not present transaction detector 546 can associate, with card not present transactions, data about the card not present transaction corresponding to data types collected by failed card read detector 544.

Matcher 348 can be configured to receive data from failed card read detector 544 and card not present transaction detector 546 and analyze it to find correspondences for data values with the same data type. By finding any of: correspondences between particular data types or sets of data types, a number of correspondences, or a similarity between data from a failed card read and a card not present transaction, matches to form transaction pairs can be made.

Fee adjuster 550 can be configured to compute an amount that should be adjusted based on a difference between a card not present fee rate and a card present fee rate. Fee adjuster 550 can apply the amount for either a completed or uncompleted card not present transaction that has been matched to failed card read by matcher 548. The fee adjuster can be configured to either rebate the amount to an entity that paid a transaction fee for the completed card not present transaction, or can be configured to modify the uncompleted card not present transaction to be performed at a lower rate.

Messenger 552 can be configured to provide a notice that a card not present transaction either will be charged at a lower rate determined by fee adjuster 550, or that a rebate will be paid based on the amount computed by fee adjuster 550. The notice can be provided as part of a display in a flow of a card not present transaction, as a separate notification on a mobile device, through an alternate communication transmission such as SMS or email, or as part of a transaction log for one or more completed transactions.

Figure 6:
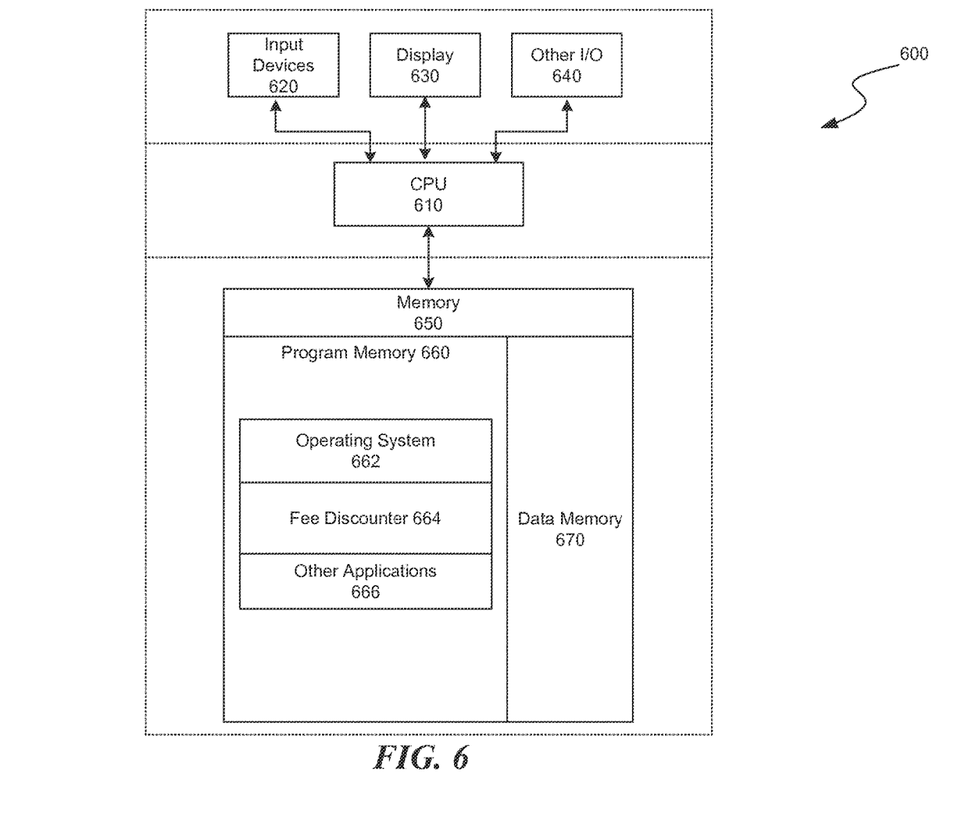
FIG. 6 is a block diagram illustrating an overview of devices on which some embodiments of the disclosed technology can operate.

FIG. 6 is a block diagram illustrating an overview of devices 600 on which some embodiments of the disclosed technology may operate. Device 600 can include one or more input devices 620 that provide input to the CPU (processor) 610, notifying it of actions. The actions are typically mediated by a hardware controller that interprets the signals received from the input device and communicates the information to the CPU 610 using a communication protocol. Input devices 620 include, for example, a mouse, a keyboard, a touchscreen, an infrared sensor, a touchpad, a wearable input device, a camera- or image-based input device, a microphone, or other user input devices.

CPU 610 can be a single processing unit or multiple processing units in a device or distributed across multiple devices. CPU 610 can be coupled to other hardware devices, for example, with the use of a bus, such as a PCI bus or SCSI bus. The CPU 610 can communicate with a hardware controller for devices, such as for a display 630. Display 630 can be used to display text and graphics. In some examples, display 630 provides graphical and textual visual feedback to a user. In some implementations, the display includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 640 can also be coupled to the processor, such as a network card, video card, audio card, USB, firewire or other external device, a magnetic or near field card reader, camera, printer, speakers, CD-ROM drive, DVD drive, disk drive, or Blu-Ray device.

In some implementations, the device 600 also includes a communication device capable of communicating wirelessly or wire-based with a network node. The communication device can communicate with another device or a server through a network using, for example, TCP/IP protocols. Device 600 can utilize the communication device to distribute operations across multiple network devices.

The CPU 610 has access to a memory 650. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, wire arrangements, floppy disks, written bar or QF codes, CDs, DVDs, magnetic storage devices or strips, tape drives, device buffers, and so forth. A memory is not a propagating signal divorced from underlying hardware; a memory is thus non-transitory. Memory 650 includes program memory 660 that stores programs and software, such as an operating system 662, fee discounter 664, and any other application programs 666. Memory 650 also includes data memory 670 that can include data about failed card reads, data about card not present transactions, failed card read to card not present transaction matching criteria, rebate message snippets, fee structures, configuration data, settings, and user options or preferences which can be provided to the program memory 660 or any element of the device 600.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

FIG. 7 is a block diagram illustrating an overview of an environment 700 in which some embodiments of the disclosed technology may operate. Environment 700 can include one or more client computing devices 705A-D, examples of which may include device 600. Client computing devices 705 can be coupled to card readers 707, such as card readers 707A-D, via wired communication such as card reader 707A, wireless communication such as card reader 707C, or can be internal to a device, such as card reader 707D. Card readers 707 can be configured to read magnetic strips, such as card reader 707A, near field communication, such as card reader 707D, other types of card storage medium, or any combination thereof. Client computing devices 705 can operate in a networked environment using logical connections 710 through network 730 to one or more remote computers such as a server computing device.

In some implementations, server 710 can be an edge server which receives client requests and coordinates fulfillment of those requests through other servers, such as servers 720A-C. Server computing devices 710 and 720 can comprise computing systems, such as device 600. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server/client devices. Server 710 can connect to a database 715. Servers 720A-C can each connect to a corresponding database 725A-C. As discussed above, each server 720 can correspond to a group of servers, and each of these servers can share a database or can have their own database. Databases 715 and 725 can warehouse (e.g. store) information such as data about failed card reads, data about card not present transactions, failed card read to card not present transaction matching criteria, rebate message snippets, fee structures. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. Network 730 can be the Internet or some other public or private network. The client computing devices 705 can be connected to network 730 through a network interface, such as by wired or wireless communication. While the connections between server 710 and servers 720 are shown as separate connections, these connections can be any kind of local, wide area, wired, or wireless network, including network 730 or a separate public or private network.

Several embodiments of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

The invention claimed is:

1. A method for providing a rebate for a fee charged for a card-not-present (CNP) transaction when the CNP transaction follows a failed card read, comprising:
   receiving, over a network by one or more servers of a payment processing service and from a card reader associated with a merchant via a mobile device associated with the merchant, data indicating that the card reader experienced a failed card read, wherein the failed card read is associated with an attempt, by the card reader, to read account data from a financial transaction card;
   receiving, over the network by the one or more servers and from an application executing on the mobile device associated with the merchant, an indication of a CNP transaction between the merchant and a customer facilitated by the application, wherein the indication of the CNP transaction comprises textual data representing account access data;
   matching, by the one or more servers, the failed card read with the CNP transaction; and
   at least partly in response to the matching:
      computing, by the one or more servers, a rebate amount based at least in part on a difference between a fee charged for the CNP transaction and a fee which would have been charged if the CNP transaction had been performed as a card present transaction; and
      crediting, by the one or more servers to an entity responsible for paying a fee for the CNP transaction, the rebate amount.

2. The method of claim 1 further comprising providing, by the one or more servers, to the entity responsible for paying the fee for the CNP transaction, a message including one or more of:
   that the rebate amount has been credited to the entity responsible for paying the fee for the CNP transaction;
   instructions on how to avoid card read failures in the future; or
   an offer to replace the card reader which may have caused the failed card read.

3. The method of claim 2 further comprising:
   determining, by the one or more servers, whether a most likely cause of the failed card read was an equipment fault or an improper use of the card reader;
   based on determining that the most likely cause of the failed card read was an equipment fault, including in the message at least the offer to replace the card reader; and
   based on determining that the most likely cause of the failed card read was an improper use of the card reader, including in the message at least the instructions on how to use the card reader to avoid card read failures in the future.

4. The method of claim 2, wherein the message is provided as at least one of an email, as a Short Message Service (SMS) text, as a notification in the application that facilitated the CNP transaction, or as a notification in another application executing on the mobile device.

5. The method of claim 2, wherein the message is provided as a notification in the application that facilitated the CNP transaction.

6. The method of claim 1, wherein the matching is performed by correlating, between the failed card read and the CNP transaction, one or more of:
   a time interval,
   a transaction amount for the CNP transaction,
   transaction purchaser identification for the CNP transaction,
   transaction merchant identification for the CNP transaction, or
   identification of items or services involved in the CNP transaction.

7. The method of claim 1, wherein crediting the rebate amount comprises modifying the fee for the CNP transaction to a lower fee that would be charged if the CNP transaction were performed as a card present transaction.

8. The method of claim 1, wherein the matching is performed by correlating, between the failed card read and the CNP transaction, one or more of:
   a transaction identifier,
   a transaction type,
   an account number,
   an issuing credit agency of the financial transaction card,
   an expiration date of the financial transaction card,
   a card verification value (cvv) of the financial transaction card,
   an address of an owner of the financial transaction card,
   a phone number of the owner of the financial transaction card,
   an email of the owner of the financial transaction card,
   a zip code of the owner of the financial transaction card, or
   an identification of the mobile device associated with the merchant.

9. The method of claim 1, wherein the card reader associated with the merchant is a component of the mobile device associated with the merchant.

10. The method of claim 1, wherein the mobile device is a point-of-sale device.

11. A system comprising
   a card reader associated with a merchant;
   a mobile device associated with the merchant;
   a payment processing server having one or more non-transitory computer-readable media storing instructions executable by one or more processors, wherein the one or more processors, upon execution of the instructions, perform acts comprising:
      receiving, over a network from the card reader and via the mobile device, data indicating that the card reader experienced a failed card read, wherein the failed card read is associated with a failed attempt, by the card reader, to read account data from a financial transaction card;
      receiving, over the network from an application executing on the mobile device, an indication of a card-not-present (CNP) transaction between the merchant and a customer facilitated by the application, wherein the indication of the CNP transaction comprises textual data representing account access data;

matching the failed card read with the CNP transaction; and at least partly in response to the matching:

computing a rebate amount based at least in part on a difference between a fee charged for the CNP transaction and a fee which would have been charged if the CNP transaction had been performed as a card present transaction; and crediting, to an entity responsible for paying a fee for the CNP transaction, the rebate amount.

12. The system of claim 11, wherein the one or more processors, upon execution of the instructions, perform acts further comprising:

providing, to the entity responsible for paying the fee for the CNP transaction, a message including one or more of:

that the rebate amount has been credited to the entity responsible for paying the fee for the CNP transaction;

instructions on how to avoid failed card reads in the future; or an offer to replace the card reader which may have caused the failed card read.

13. The system of claim 12, wherein the one or more processors, upon execution of the instructions, perform acts further comprising:

determining whether a most likely cause of the failed card read was an equipment fault or an improper use of the card reader;

based on determining that the most likely cause of the failed card read was an equipment fault, including in the message at least the offer to replace the card reader; and based on determining that the most likely cause of the failed card read was an improper use of the card reader, including in the message at least the instructions on how to use the card reader to avoid card read failures in the future.

14. The system of claim 12, wherein the message is provided as a notification in the application that facilitated the CNP transaction.

15. The system of claim 12, wherein the message is provided as at least one of an email, as a Short Message Service (SMS) text, as a notification in the application that facilitated the CNP transaction, or as a notification in another application executing on the mobile device.

16. The system of claim 11, wherein the matching is performed by correlating, between the failed card read and the CNP transaction, one or more of:

a time interval,
a transaction amount for the CNP transaction,
transaction purchaser identification for the CNP transaction,
transaction merchant identification for the CNP transaction, or
identification of items or services involved in the CNP transaction.

17. The system of claim 11, wherein the matching is performed by correlating, between the failed card read and the CNP transaction, one or more of:

a transaction identifier,
a transaction type,
an account number,
an issuing credit agency of the financial transaction card,
an expiration date of the financial transaction card,
a card verification value (cvv) of the financial transaction card,
an address of an owner of the financial transaction card,
a phone number of the owner of the financial transaction card,
an email of the owner of the financial transaction card,
a zip code of the owner of the financial transaction card, or
an identification of the mobile device.

18. The system of claim 11, wherein crediting the rebate amount comprises modifying the fee for the CNP transaction to a lower fee that would be charged if the CNP transaction were performed as a card present transaction.

19. The system of claim 11, wherein the card reader is a component of the mobile device.

20. The system of claim 11, wherein the mobile device is a point-of-sale device.

21. A non-transitory computer-readable medium storing instructions that, when executed by a computing system, cause the computing system to perform operations comprising:

receiving, over a network from a card reader associated with a merchant via a mobile device associated with the merchant, data indicating that the card reader experienced a failed card read, wherein the failed card read is associated with a failed attempt, by the card reader, to read account data, and wherein the card reader is configured to read account data from a financial transaction card;

receiving, over the network from an application executing on the mobile device associated with the merchant, an indication of a card-not-present (CNP) transaction between the merchant and a customer facilitated by the application, wherein the indication of the CNP transaction comprises textual data representing account access data;

matching the failed card read with the CNP transaction; and at least partly in response to the matching:

computing a rebate amount based at least in part on a difference between a fee charged for the CNP transaction and a fee which would have been charged if the CNP transaction had been performed as a card present transaction; and crediting, to an entity responsible for paying a fee for the CNP transaction, the rebate amount.

22. The non-transitory computer-readable medium of claim 21, wherein the instructions cause the system to perform operations further comprising:

providing, to the entity responsible for paying the fee for the CNP transaction, a message including one or more of:

that the rebate amount has been credited to the entity responsible for paying the fee for the CNP transaction;

instructions on how to avoid failed card reads in the future; or an offer to replace the card reader which may have caused the failed card read.

23. The non-transitory computer-readable medium of claim 22, wherein the instructions cause the computing system to perform operations further comprising:

determining whether a most likely cause of the failed card read was an equipment fault or an improper use of the card reader;

based on determining that the most likely cause of the failed card read was an equipment fault, including in the message at least the offer to replace the card reader; and based on determining that the most likely cause of the failed card read was an improper use of the card reader, including in the message at least the instructions on how to use the card reader to avoid card read failures in the future.

24. The non-transitory computer-readable medium of claim 22, wherein the message is provided as at least one of an email, as a Short Message Service (SMS) text, as a notification in the application that facilitated the CNP transaction, or as a notification in another application executing on the mobile device.

25. The non-transitory computer-readable medium of claim 22, wherein the message is provided as a notification in the application that facilitated the CNP transaction.

26. The non-transitory computer-readable medium of claim 21, wherein the matching is performed by correlating, between the failed card read and the CNP transaction, one or more of:
- a time interval,
- a transaction amount for the CNP transaction,
- transaction purchaser identification for the CNP transaction,
- transaction merchant identification for the CNP transaction, or
- identification of items or services involved in the CNP transaction.

27. The non-transitory computer-readable medium of claim 21, wherein the matching is performed by correlating, between the failed card read and the CNP transaction, one or more of:
- a transaction identifier,
- a transaction type,
- an account number,
- an issuing credit agency of the financial transaction card,
- an expiration date of the financial transaction card,
- a card verification value (cvv) of the financial transaction card,
- an address of an owner of the financial transaction card,
- a phone number of the owner of the financial transaction card,
- an email of the owner of the financial transaction card,
- a zip code of the owner of the financial transaction card, or
- an identification of the mobile device associated with the merchant.

28. The non-transitory computer-readable medium of claim 21, wherein crediting the rebate amount comprises modifying the fee for the CNP transaction to a lower fee that would be charged if the CNP transaction were performed as a card present transaction.

* * * * *